Dec. 2, 1969  F. H. SLAYMAKER  3,482,101
ELECTRO-OPTICAL SIGNAL PROCESSING SYSTEMS
Filed Sept. 22, 1966
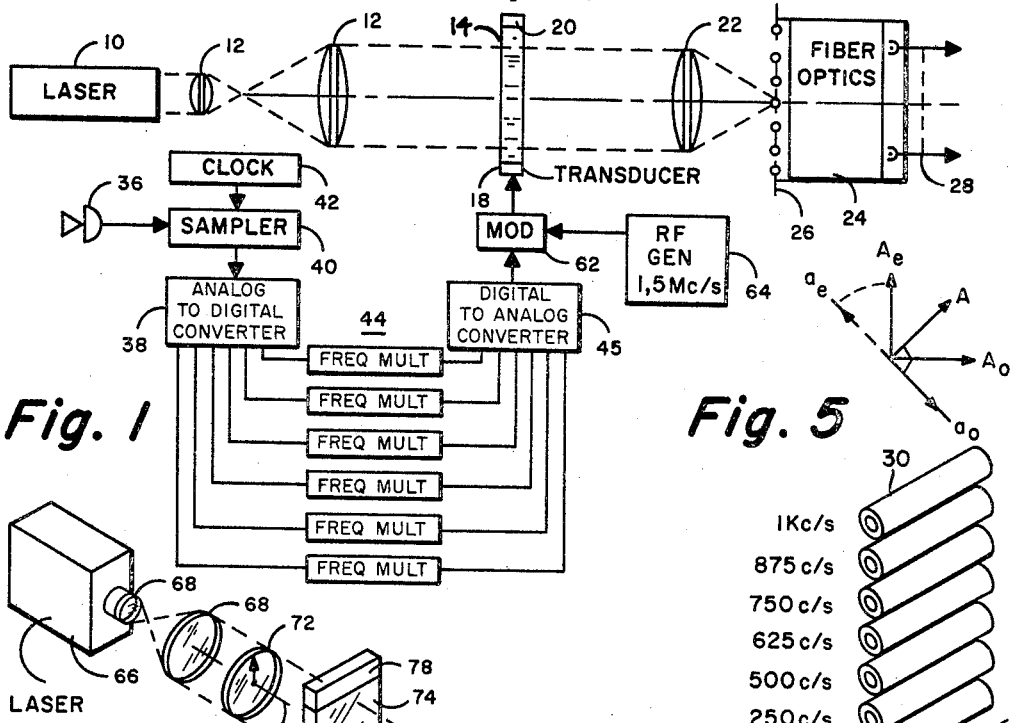
Fig. 1
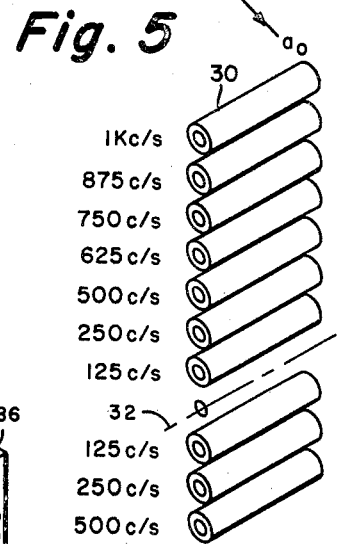
Fig. 5
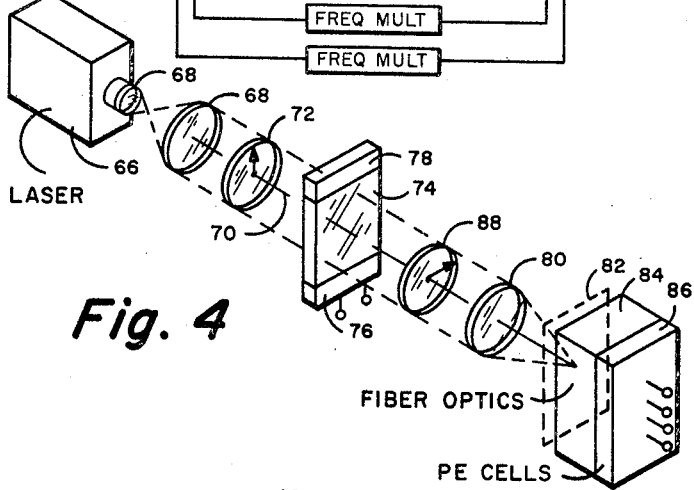
Fig. 4
Fig. 2
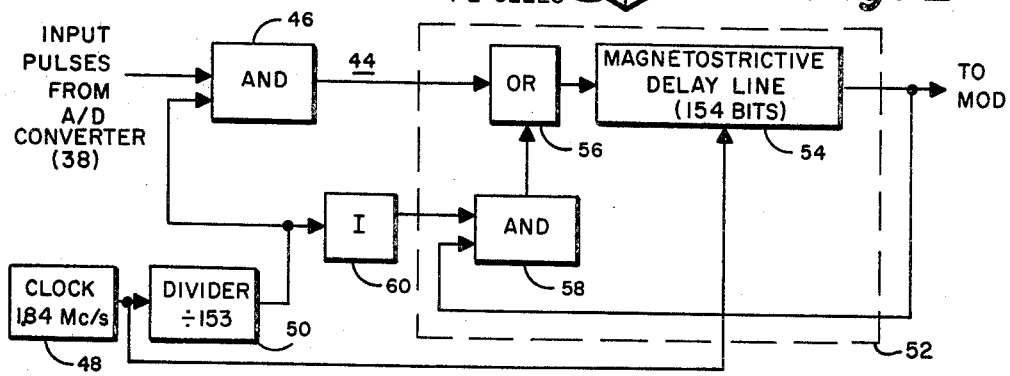
Fig. 3
INVENTOR.
FRANK H. SLAYMAKER
BY  ATTY United States Patent Office 3,482,101
Patented Dec. 2, 1969

3,482,101
ELECTRO-OPTICAL SIGNAL PROCESSING
SYSTEMS
Frank H. Slaymaker, Rochester, N.Y., assignor to
General Dynamics Corporation, a corporation of
Delaware
Filed Sept. 22, 1966, Ser. No. 581,373
Int. Cl. H04b 9/00
U.S. Cl. 250—199     12 Claims

ABSTRACT OF THE DISCLOSURE

A system for the spectrum analysis of speech signals is disclosed. The system includes a laser and an electro-optical arrangement for deriving electrical signals from the optical space pattern in the back focal plane of the lens. The electro-optical system includes a diffraction cell in the front focal plane area of the lens. A digital frequency multiplying system is used to excite the cell so that a sufficient number of cycles of the signal being analyzed are available in the cell at any time to establish a diffraction of the laser beam which propagates through the cell so that these can be translated into the Fourier components of the signal under analysis. Non-linearity in the Fourier transform are produced by an arrangement of polarizers and analyzers which eliminate phase distortion within the cell and only permits the amplitude of the signals to affect the diffraction pattern.

---

The present invention relates to systems for processing electrical signals by optical means and particularly to an electro-optical system for analysis of electric signals.

The invention is especially suitable for the analysis of speech and other acoustic signals. However, the invention may be applied for pattern recognition purposes and for the analysis of other signals, such as radar and sonar returns.

Optical systems have the property that a Fourier transform relationship exists between the light amplitude distributions at the front and back focal planes of a lens used in such systems. Thus, if a transparency, such as an optical sound track is disposed in the front focal plane of a lens and illuminated with collimated, monochromatic, coherent light, the optical display at the back focal plane will be related to the Fourier transform of the optical signal on the sound track. This relationship is most useful when the light source is a coherent, monochromatic source. Photographic processes for translating an electrical signal to an optical signal, such as an optical sound track, preclude the use of optical processing for real time analysis of electrical signals. Moreover, certain rapidly changing signals have wave lengths smaller than the resolution of photographic films and it is not possible to translate such photographic signals into optical form. It is possible to translate an electrical signal into a sound beam in a transparent medium thereby creating a diffraction cell through which a light beam may be passed into the lens for analysis purposes. There are, however, serious disadvantages to the use of such diffraction cells. One of these disadvantages results from the high velocity of sound in liquids and transparent solids which may propagate the sound beam. Due to this high propagation velocity, a sufficient number of cycles of the signal do not exist in a cell of reasonable size. Another disadvantage is that a phase grating, as is produced by the variable density pattern in the diffraction cell material as the sound wave progresses along the cell will give many orders of optical diffraction fringes, even though the signal which propagates through the cell is purely sinusoidal. The action of this phase grating in producing higher order fringes is similar to the action of non-linearities in an electric processing system which results in the introduction of harmonics into the output signal.

Accordingly, it is an object of the present invention to provide improved electro-optical signal processing systems wherein the foregoing difficulties and disadvantages are substantially eliminated.

It is a further object of the present invention to provide an improved electro-optical system wherein electric signals may be translated to optical form so as to obtain the advantages of optical processing.

It is a still further object of the present invention to provide an improved electro-optical processing system which is operative in real time.

Briefly described, an electro-optical system embodying the present invention includes a source of radiant energy, such as a laser which produces a beam of coherent light. This beam is incident upon a lens. An opto-electric transducer is located adjacent to the back focal plane of a lens to derive electrical signals representing the Fourier components of an electrical signal to be analyzed. The electrical signal to be analyzed is translated into optical form by means of an optical diffraction cell which is located, for one example, in the front focal plane of the lens. This diffraction cell may include a transparent body of liquid, say water, or it may be a quartz plate ultrasonically vibrated at one end of the plate by, say a transducer. The vibrations propagate through the transducer cell and are absorbed at the opposite end of the cell by a sound absorbing material. The input signals to be analyzed, say speech signals, are sampled at a high rate, say two or three times as high as the highest frequency components thereof, and effectively multiplied in frequency by a frequency multiplier which may include a magnetostrictive delay line which is capable of storing a large number of bits, each representing a successive pulse of the signal. The signals are recirculated through the line at a rapid rate so that output signal is effectively multiplied by the number of bits which may be stored in the line. The multiplied signal may be amplitude modulated upon a radio frequency carrier and the modulated carrier excites the transducer at the edge of the diffraction cell. The transducer generates vibrations corresponding to the amplitude modulated signal which propagates through the cell and produces variable density pattern therein which is translated into the Fourier components of the signal at the Fourier transform plane (viz. at the back focal plane of the lens).

In order to eliminate an effect similar to non-linearity in the Fourier transform and the high order diffraction fringes resulting therefrom, polarizers may be disposed on opposite sides of the diffraction cell and polarized so that the light waves that pass through the lens are normally 180° out of phase with each other and cancel. The diffraction cell is bi-refringent in character and it will shift the phase of one of the waves in response to the signal which is propagated therethrough. Accordingly, only the Fourier pattern representing the signal will appear at the Fourier transform plane. If the signal is purely sinusoidal, the diffraction fringes in the Fourier plane will contain only the first order fringes and no DC component or higher order fringes. Thus, the non-linearities will be reduced.

The invention itself, both as to its organization and method of operation, as well as additional objects and advantages thereof will become more readily apparent from a reading of the following description in connection with the accompanying drawings in which:

FIG. 1 is a schematic diagram of an electro-optical signal processing system embodying the invention;

FIG. 2 is a diagrammatic presentation of the fiber optic array used in the system of FIG. 1;

FIG. 3 is a block diagram of the frequency multiplying system used in the system of FIG. 1;

FIG. 4 is a diagrammatic showing of an electro-optical system similar to the system of FIG. 1 in which polarization is used for improving for linearity of the optic analysis; and FIG. 5 is a vector diagram which is explanatory of the operation of the system of FIG. 4.

Referring more particularly to FIG. 1, there is shown a laser 10 which provides a source of coherent light which illuminates collimating lenses 12. The lenses 12 project a light beam through a diffraction cell 14. The cell may be a chamber, say of glass, containing a fluid 16, such as water. A transducer 18 is disposed along one edge of the cell. This transducer may be an ultrasonic transducer of the types known in the art, such as a barium titanate transducer. A body of sound absorbing material 20 provides an acoustic termination which matches the acoustic impedance of the cell, thereby preventing any reflection of vibrations which propagate along the cell and strike the termination 20. Suitable termination material may be foamed polyurethane. It is desirable to have the terminated end of the cell wedge shaped so that the termination material fills an area surrounding the wedge.

Another lens 22 is located, preferably, in a position wherein the front focal plane of the lens 22 is in the plane of the cell 14. At the back focal plane 26 of the lens, a series of spots appears, the intensity of which is a function of the amplitude and frequency of the Fourier components of the vibrations (viz. the acoustic signal), which propagate through the cell 14. Of course, the cell may be located any place in the path of the rays on the left of the transform or back focal plane if phase distortion effects can be tolerated. Physics of optic Fourier analysis is set forth in detail in an article which may be found in the IRE Transactions on Information Theory, vol. 1T6, No. 3, June 1960, pp. 386–400. Adjacent to the back focal plane of Fourier transform plane 26 is disposed an array of fiber optics 24, which may be in the form of individual fiber optic cells disposed along the line at which the spots representing the Fourier components appear. The fiber optics permits the spatial pattern to be expanded so as to provide space for the locations of photoelectric devices 28, such as photo multipliers or photo electric (say cadmium sulphide) cells. Each cell will correspond to a different spatial unit along the line at which the Fourier components are produced. For example, as shown in FIG. 2, individual fiber optic cells 30 are provided adjacent to the first order diffraction fringe 32 on the positive side of the optical axis 34. Each fiber is located in the position corresponding to different frequency components of the transform which are separated by 125 c./s. steps. It will be noted that both positive and negative fringes appear, inasmuch as the acoustic signal corresponds to an amplitude modulated signal on a carrier and both the upper and lower frequency sidebands of the amplitude modulated signals are produced.

The signals to be analyzed, in the illustrated example speech signals, are applied to the transducer 18 in a form whereby several cycles of the signal will be translated into optical signals presented by regions of variable density in the cell 14. In the regions of high density, the light wave travels with a lower velocity and is retarded with respect to the light passing through the less dense portion of the sound wave in the cell. The system of circuits for generating the transducer exciting signal includes a microphone 36, the speech signal output of which is amplified. This output is sampled in a sampler circuit 40 to which clock pulses are applied at a rate two or three times as high as the highest audio frequency signal which is translated by the microphone 36. For example, pulses may be generated by a clock pulse generator 42 having an output frequency or pulse rate of 12 kc./s. The clock pulses enable the sampler for their duration and the sampler 40 passes a series of pulses to an analog to digital converter 38 which delivers a six bit parallel code to a frequency multiplying system 44.

One section of the frequency multiplying system 44 is shown in greater detail in FIG. 3 which is the frequency multiplier for just one of the six parallel bits. The input pulses from the A–D converter are applied to an AND gate 46. This AND gate also receives a signal generated by dividing the output of a clock pulse generator 48 in a divider circuit 50. The clock pulse generator 48 is shown as having a frequency or pulse rate of 1.84 mc./s. This pulse rate is divided by 153 in the divider 50 to produce a clock pulse frequency of 12 kc./s. The clock pulse rate and dividing ratio are selected so as to be compatible with the storage capacity of a recirculating bit storage device 52. This bit storage device has as its principal element a magnetostrictive delay line 54 which in this illustrative embodiment has a capacity of 154 bits. These bits are entered into the line at the clock pulse rate by connecting the clock generator 48 output to the input thereof (this input is sometimes called the AC input of the line). Logic circuitry includes an OR gate 56 connected to the input of the line 54, an AND gate 58 for recirculating the output bits from the line back into the line through the OR gate 56, and an inverter 60 for inhibiting the recirculation of line output bits into the line when the AND gate 46 is enabled to accept a new sample bit from the converter 38. Thus, the AND gate 58 continuously recirculates bits through the line at the clock pulses rate (1.84 mc./s.). However, for each 153 bits which are applied to the line, there is a new bit (viz. an input pulse from the converter 38) which is applied to the line. The pulse rate of the clock 48 is very much higher than the pulse rate of the clock 42 which enables the sampler 40 so that the magnetostrictive delay line effectively stores groups of 154 bits, each group corresponding to a successive input pulse from the sampler. These groups are provided at the output of the line at a frequency or pulse rate of 1.84 mc./s. Accordingly, the frequency of the input pulse from the sampler is effectively multiplied by virtue of the recirculating action of the frequency multiplier 44.

The storage device 52 may be similar to the serial memory model SM32 which is available from the Computer Controls Company of Framingham, Massachusetts.

The output of all six multipliers together constitute a six bit parallel code representing the amplitude of the input signal with all frequencies multiplied by 153 or what amounts to the same thing, time compressed by 1/153. The six bit code is converted back to analog form again by the D–A converter 45 and the output at the D–A converter fed into modulator 62. If one bit coding is sufficient, another transducer may be disposed between the sound absorbing member 20 and the edge of the cell 14 which is adjacent thereto, in lieu of frequency multiplying system 44. Connections may be provided between the input to the transducer 18 and the other transducer at the opposite end of the cell therefrom. These connections provide a feedback loop for recirculating the acoustic signals through the cells 14. Inasmuch as a finite delay time is required for propagation of each pulse which is applied to the transducer 18 due to the input signal from the microphone 36, the signals will be recirculating at a frequency equal to the inverse of the propagation time through the cell 14. This delay time is much shorter than the interval between sampling (viz the clock pulse period of the pulses applied to the sampler 40), the frequency of the input signal has translated into acoustic form in the cell 14 will be increased. The frequency multiplier system, shown in FIG. 3, is, however, preferred to the above described frequency multiplying system which relies upon the inherent delay time in the cell and is presented here as a possible alternative frequency multiplier.

The frequency multiplier output is converted back into analog form by a digital to analog converter 45, and is applied to a modulator 62 together with a signal generated by a radio frequency generator 64 which produces an output sinusoidal waveform having a frequency of 1.5 mc./s. in this illustrative embodiment. The modulator 62 may be a plate type modulator stage of the type generally used to process AM modulation. Thus, the output of the modulator 62 contains output frequencies corresponding to the sum and difference of the frequency multiplier output frequency and the RF generator 64 frequency. The transducer therefore propagates an acoustic signal having a center frequency of 1.5 mc. which varies in amplitude at the audio rate. This 1.5 mc. signal may be considered as a carrier frequency. A pattern of regions of increased and decreased density is produced in the liquid 16 and in the cell 14 as the acoustic wave transverses the cell. These regions present a diffraction grating in the front focal plane of the lens 22 and provide the Fourier transform of the acoustic signal in the back focal plane 26 of the lens 22, as explained above. Even though higher order fringes of the RF carrier are produced in the Fourier transform plane, the fringes due to the modulation of the RF carrier that appear on each side of the first order diffraction fringe have a one-to-one correspondence to the frequencies present in the output of the converter 45. The components of the signal are obtained by the fiber optics 24 and opto-electric transducers 28, also as explained above. The Fourier transform is produced simultaneously with the input signal applied to the microphone or in real time thereby obviating the need for a film to provide the variable optical density pattern for Fourier analysis.

tI will be appreciated that other optical processes may be accomplished by means of the invention. For example, in lieu of fiber optics for translating the optic signal at the Fourier transform plane into an electric signal another cell, similar to the cell 14, may be positioned at the plane 26 and another signal may be applied thereto in a manner similar to the signal which is applied to the transducer 18 of the cell 14 to the michophone 36. A lens placed with its front focal plane in the plane of the second cell 14 may provide an optical signal which corresponds to the multiplication product of the two electric signals which correspond to the acoustic signal propagated through their respective cells. This optical signal may be translated into electrical form to obtain an output corresponding to the correlation of the two electrical signals, filtered version of either of the electrical signals or merely the product thereof.

The system of FIG. 4 may be used in the event that it is desired to remove the higher order fringes which result from non-linearities in the optical processing system. Further information respecting the generation of such higher order fringes may be found in the text Ultrasonics (Wiley, 1938), by Bergman and Hatfield, pp. 63–89. In FIG. 4, a laser 66 illuminates lenses 68 with coherent light. The lenses collimate this light and project it along an optical axis 70.

In order to eliminate the apparent nonlinear action of the phase gating in producing higher order diffraction fringes from a purely sinusoidal input, means is introduced to produce an amplitude variation in the light leaving the diffraction cell, rather than a phase variation. The amplitude variation is a linear function of the amplitude of the sonic signal in the cell. When this linear amplitude relationship is established between the sonic input signal and the output light amplitude, it is not necessary to modulate the signal onto a radio frequency sound carrier.

The means used to produce a linear amplitude relation consists of a polarizer 72 (the polarizer 72 may not be needed if the laser light is initially polarized as is the case when a helium neon laser is used) between the light source and the diffraction cell 74. The cell is made of a material that is bi-refringent under stress. Another polarizer 88 (usually called an analyzer) is located in the path of light leaving the diffraction cell 74 and is oriented to cancel the steady light output of the laser in the absence of a sound wave signal in the cell 74.

The action of the stress bi-refringent material in the cell on the polarized light may be explained with reference to FIG. 5. In the cell 74, there exists both a time phase angle between the ordinary and extraordinary light rays in the stress bi-refringent material therein and the space angle between the direction of the electric vector of the ordinary and extraordinary light rays in the bi-refringent material. In general, two light waves can interfere to produce a diffraction pattern only if they are polarized so their electric vectors are in the same space direction.

When the polarized light from the polarizer 72 enters the diffraction cell 74, it is split into two beams that travel at different velocities provided the stress bi-refringent material is under stress due to the presence of a sound wave. The two beams, called the ordinary and extraordinary rays, are polarized at right angles to each other and have an electrical time phase difference between them given by the following expression:

$$R_t = ct(p-q)$$

where:

$R_t$ = relative retardation in wavelengths, or phase difference, between the ordinary ray and the extraordinary ray in a stress bi-refringent material.
$c$ = stress-optic coefficient
$t$ = thickness of the plate
$p$ and $q$ = the principle stresses For further information respecting the derivation of this equation reference may be had to the text Photoelasticity by Frocht (see vol. I, p. 136) Wiley 1941.

In FIG. 5, the vector A represents the direction of polarization of the light from polarizer 72, $A_o$ is in the direction of polarization of the ordinary ray after the light leaves the stress bi-refringent material and $A_e$ is in the direction of polarization of the extraordinary ray after the light leaves the stress bi-refringent material. When these two components $A_o$ and $A_e$ are passed through the other polarizer (analyzer) 88 that is oriented to pass light polarized at right angles to A, the components of $A_e$ and $A_o$ are resolved onto the plane of polarization set by analyzer 88, shown $a_e$ and $a_o$ respectively, are in opposite directions and are equal in amplitude.

If these components are also of the same relative time phase, i.e.: one is not delayed in time with respect to the other, they will cancel and there will be no light output from the analyzer 88.

If there is no sound wave in the cell $p-q=0$ (see Equation 1), the two rays travel with the same velocity so there is no relative phase difference. In the absence of a sound wave in the cell then, there is no light output from the cell.

Consider now the time phase differences as they affect the components. In the absence of a sound wave, $a_e$ and $a_o$ are equal in amplitude and have their positive direction indicated as diametrically opposite—which is the same as saying that they are 180° out of phase time-wise. If a sound wave is directed down the cell so that $(p-q)$ varies sinusoidally, we will have $R_t$ ranging sinusoidally from some maximum positive value to some maximum negative value.

The extraordinary component $a_e$ would vary slightly in time phase by an angle of $\pm\theta$, the deviation due to the stress variation in the bi-refringent material and the resultant component will vary in amplitude as a linear function of $\theta$ but will show very little time phase variation, being substantially at $\pm 90°$ (viz. perpendicular to $a_o$) all of the time.

If at this point we picked up the output of the analyzer 88 with some light-intensity sensitive device, such as a photo cell, the human eye or a photographic emulsion, we would find that the detecting device would give an output that was proportional to the square of the input signal and would contain double frequencies and other second order distortion products. It would be necessary, then, to operate at a bias away from zero resultant light intensity in order to maintain linearity.

With the coherent light source which produces the Fourier transform at plane 82, and the lens 80, a linear transformation results and the spots of light in the transform plane 82 have a one-to-one correspondence to the frequency components present in the original sound wave. No quarter-wave plate is necessary as is used in many polarized light systems to bias the system away from zero.

Although the mode of operation of the system shown in FIG. 4 is presented in order to impart a better understanding of the invention, it should not imply any restriction of the invention thereto.

From the foregoing description, it will be apparent that there has been provided an improved electro-optical signal processing system. Although embodiments of the system for Fourier analysis of signals have been illustrated, it will be appreciated that the invention may be applied for performing other signal processing techniques by optical means. Also, other signals, such as sonar and radar returns, may be processed. It will be further appreciated that where several channels are involved, these may be analyzed simultaneously along different lines spaced from each other in the Fourier transform plane. Accordingly, the foregoing descriptions should be taken merely as illustrative and not in any limiting sense.

What is claimed is:

1. An optical signal analysis system comprising
   (a) a source of coherent light,
   (b) means for imaging the light rays from said source at a Fourier transform plane,
   (c) an optical diffraction cell disposed in the path of said rays,
   (d) a source of audio frequency signals to be analyzed,
   (e) means responsive to said audio frequency signals for multiplying the frequency thereof, and
   (f) means coupled to said cell for translating said multiplied audio signals into an acoustic wave propagating through said cell whereby several cycles of said audio signal exists concurrently in said cell so as to produce a pattern of spacially related illuminated regions representing the Fourier spectrum of said audio frequency signals to be analyzed at said plane, and
   (g) opto-electric transducing means for deriving electric signals corresponding to the optical pattern at said plane and disposed in said plane to intercept the illuminated regions representing said Fourier spectrum.

2. The invention as set forth in claim 1 wherein said imaging means is a lens having front and back focal planes, said cell being disposed at said front focal plane, and said transducing means being disposed at said Fourier transform plane adjacent to said back focal plane.

3. The invention as set forth in claim 1 wherein said frequency multiplying means includes means for circulating said audio signals around a closed circuit path at a rate higher than the frequency of said audio signals.

4. The invention as set forth in claim 3 wherein said recirculating means includes a delay line having storage for a plurality of signal elements, clock means for shifting said signal elements along said line, and logic means for entering said input signals into a said line at successive intervals.

5. The invention as set forth in claim 1 wherein said optical cell includes a body of bi-refringent material and wherein polarizers which are polarized transversely to each other are disposed on opposite sides of said cell along the path of light therethrough.

6. The invention as set forth in claim 1 wherein said optical cell includes a transducer for translating signals applied thereto from said applying means into acoustic vibrations and wherein a sound absorbing material having an acoustic impedance matched to the acoustic impedance of said cell is disposed along an edge of said cell opposite to said transducer.

7. The invention as set forth in claim 1 wherein said light source is a laser.

8. The invention as set forth in claim 1 wherein said means for translating the optical pattern at the Fourier transform plane of said lens includes an array of fiber optical fibers disposed in predetermined spaced relationship and photoelectric devices responsive to the light transmitting through each of said elements.

9. The invention as set forth in claim 4 wherein said frequency multiplying means includes means for sampling said audio signals at a predetermined rate higher than the highest frequency component thereof to provide said signal elements, and for applying said signal elements to said delay line.

10. The invention as set forth in claim 9 wherein said means coupled to said cell further includes a source of high frequency signals, a modulator which receives input signals from said high frequency source and from the output of said delay line, and means for applying the output signal from said modulator to said cell for translation into acoustic form.

11. An optical processing system comprising
    (a) means for providing a beam of monochromatic coherent light and projecting said light beam along an optical axis,
    (b) means for polarizing said light in one direction,
    (c) means for polarizing said light in another direction whereby to block the transmission of said light,
    (d) said polarizing means being spaced from said first named polarizing means along said optical axis,
    (e) a lens disposed along said optical axis for passing light projected through said second polarizing means to a Fourier transform plane,
    (f) an optical diffraction cell including a body of bi-refringent material disposed along said optical axis between said polarizing means,
    (g) means responsive to said electrical signal for exciting said body to propagate an optical diffraction pattern including a plurality of cycles of said signal and corresponding thereto, and
    (h) said last named means including means for translating said electrical signal into an output signal having a frequency which is a multiple of said electrical signal and applying said output signal to said exciting means.

12. The invention as set forth in claim 11 wherein said exciting means includes means for converting said electrical signal into successive multi-bit digital words, said multiplying means including means for multiplying the repetition rate of each bit of said words and said exciting means further including means for converting said frequency multiplied words into said output signal.

References Cited

UNITED STATES PATENTS

| | | | |
|---|---|---|---|
| 2,707,749 | 5/1955 | Mueller | 250—199 |
| 2,879,337 | 3/1959 | Reis | 179—15.55 |
| 2,958,039 | 10/1960 | Anderson | 179—15.55 |
| 3,093,796 | 6/1963 | Westerfield | 179—15.55 |
| 3,297,876 | 1/1967 | DeMaria | 250—199 |

FOREIGN PATENTS 814,158  5/1959  England.

OTHER REFERENCES

F. H. Nicoll: RCA Technical Notes, Mural Television Display Using Fiber Optics, RCA TN No. 188, Aug. 18, 1958, Class 178, Subclass 6 LCR.

ROBERT L. GRIFFIN, Primary Examiner

ALBERT J. MAYER, Assistant Examiner

U.S. Cl. X.R.

179—15.55